United States Patent [19]

Surles

[11] Patent Number: 5,710,109
[45] Date of Patent: Jan. 20, 1998

[54] METHOD FOR ACIDIZING FORMATION HAVING HIGH PERMEABILITY WATER ZONES

[75] Inventor: Billy Wayne Surles, Houston, Tex.

[73] Assignee: Texaco Inc., White Plains, N.Y.

[21] Appl. No.: 489,647

[22] Filed: Jun. 12, 1995

[51] Int. Cl.$^6$ .............................. C09K 7/00; E21B 43/04
[52] U.S. Cl. ..................... 507/114; 507/103; 507/135; 507/203; 507/216; 507/255; 507/260; 166/276; 166/295; 166/300
[58] Field of Search .................................. 507/114, 103, 507/135, 216, 255, 203, 260; 166/276, 295, 300

[56] References Cited

U.S. PATENT DOCUMENTS 4,147,211   4/1979   Sandiford ........................ 166/270
4,895,207   1/1990   Freidman et al. ................ 166/300

*Primary Examiner*—Sharon Gibson
*Assistant Examiner*—Valerie Fee
*Attorney, Agent, or Firm*—Henry H. Gibson; John R. Kirk, Jr.

[57] ABSTRACT

An improved method for acidizing an oil bearing formation in the presence of water bearing zones having high permeability is described. An aqueous fluid is pumped into the formation preceding the injection of stimulation material. This fluid contains hydroxyethylcellulose, a fluorescent dye and an organic acid anhydride, which during hydrolysis reduces the pH and the viscosity of the solution making it retrievable without damage to the formation.

11 Claims, No Drawings

METHOD FOR ACIDIZING FORMATION HAVING HIGH PERMEABILITY WATER ZONES

BACKGROUND

This invention relates to an improved method for stimulating oil production from oil bearing formation having inconsistent permeabilities by temporarily blocking high permeability water zones in the formation such that stimulation materials pumped down hole will migrate to oil zones rather than the high permeability water zone.

BACKGROUND OF THE INVENTION

During the extraction of oil from an oil producing formation penetrated by a wellbore, it is a normal treatment to stimulate the formation by injecting a formation stimulating material such an acid, particularly hydrochloric acid, and other acid forming materials which will react with minerals in the oil bearing formation to increase the permeability of this formation when such stimulation tactics are practiced. However, after production has proceeded for a period of time and connate water begins to invade the oil producing formation, stimulation becomes more problematical. The water zone becomes less resistant to the injection of stimulation materials, than the oil bearing zone and thus stimulation only causes the production of more water with only consequential increases in the amount of oil produced from the oil bearing zone of the formation.

Even in the case where secondary recovery is being practiced, disparate variances in permeability or injectability and the formations causes production of hydrocarbons to be problematical. In the drive situation, the driving fluid would migrate toward the path of least resistance and into the water zone on having relatively high permeability. Attempts have been made such as those described in U.S. Pat. No. 4,147,211 to cause an increase in the viscosity of such zones whereby the flow of the injection fluid would be more uniform through oil bearing formations and thus would improve production. A similar problem exists with respect to the injection stimulation fluids. Efforts have shown, however, that either the attempt to increase viscosity was ineffective or the recovery of the viscosifying agent caused damage to the oil formation or was recoverable only with great significant difficulty, if at all.

Accordingly, it is an object of this invention to provide a method for diverting stimulating fluids from parts of an oil formation where stimulation is undesirable into an oil bearing formation where stimulation is desired. It is a further object to install a blocking agent which increases the viscosity of a water zone of relatively high permeability to divert stimulating fluids to oil bearing formations. It is yet a further object of this invention to provide such a blocking agent which, by its own action, is easily recoverable from the formation and causes no damage to the formation. The accomplishment of these and other objects will be evident from the discussion of the present invention which follows.

SUMMARY OF THE INVENTION

This invention pertains to an improved method for stimulating an oil-bearing formation in the presence of widely varying permeability by employing certain fluid compositions whereby a viscous fluid is injected through a wellbore into an oil formation and introduced into a subterranean zone where the density of connate water is increased. The fluid contains an acid forming substance, such as an acid anhydride which reacts slowly with the water component of the fluid causing a reduction in pH of the fluid. The prepared viscosifying material is a mixture of hydroxyethylcellulose and a viscosity increasing additive which is a fluorescent dye, both well known materials and described in U.S. Pat. No. 4,895,207 as a gravel carrier. The viscous fluid also includes an amount of an acid anhydride, or mixtures thereof effective to reduce the pH to about 6.0 or less, preferably 5.5 or less. The presence of fluorescence dye increases the viscosity of the fluid containing hydroxyethylcellulose significantly, but the effect is eliminated entirely when the pH drops to a value of about 6.0 or less. A particularly preferred material for reducing the pH in the time desired, which is usually from about 8 to about 20 hours after mixing, depending upon concentration, is a slow reacting organic acid anhydride such as phthalic anhydride. Any other acid forming compound may be utilized, and the time for pH loss and hence viscosity reduction can be controlled by the choice of anhydride and by adjusting the concentration. Succinic anhydride is somewhat faster than phthalic anhydride. Higher molecular weight acyl halides may also be used. The concentration of acid anhydride should ordinarily be in the range of $1.5 \times 10^{-3}$ to $4 \times 10^{-3}$ and preferably $1.5 \times 10^{-3}$ to $2 \times 10^{-3}$ percent by weight. A preferred fluid for our purpose would contain from 0.17 to 0.22 percent by weight hydroxyethylcellulose, from 0.09 to 0.11 percent by weight fluorescent dye and from $1.5 \times 10^{-3}$ to $2 \times 10^{-3}$ percent by weight of phthalic anhydride or other acid anhydride. Mixtures of anhydrides can be used.

DESCRIPTION OF THE PREFERRED EMBODIMENTS

This invention involves an improved method for stimulating crude oil production from formations having varying permeability such that the zones of lower permeability, usually oil bearing, are treated in preference higher permeability formations, usually water bearing. To accomplish this, a fluid which contains a polymer to increase the fluid, whether water or brine, viscosity sufficiently to permit pumping through an injection string located in a production wellbore and into the formation. Since the path of least resistance would be toward the higher permeability it would serve to block the water zone from further injection. The water or sodium chloride fluid also contains a viscosifying amount of suitable hydrophilic polymer, and the preferred polymer is hydroxyethylcellulose, a well known non-ionic ether of cellulose which is soluble in hot or cold water, but insoluble in organic solvents. It is stable in concentrated salt solutions and nontoxic. The material may be obtained under the commercial name of NATROSOL® available from Hercules, Inc. (Wilmington, Del.) The especially preferred product is NATROSOL® 250HHR. The 250 designation on this trademark indicates a hydroxyethyl molar substitution ratio of 2.5 and the HHR is an indication of the viscosity type.

The fluid requires that the viscosity enhancing effect of the polymer be enhanced by incorporation of a fluorescent dye or other optical brightener in the fluid, as described in U.S. Pat. No. 4,895,207 which is incorporated herein by reference for all purposes. For reasons that are not entirely understood, the viscosity of the solution of hydroxyethylcellulose is increased significantly if the fluid also contains a small amount of fluorescent dye material. Commercial products suitable for this purpose include UNITEX RSB or TINOPAL CVS by Ciba-Geigy Corporation of Ardsley, N.Y. TINOPAL CVS is a distyryl biphenylderivative, specifically 2,2'-1,1'-biphenyl-4,4,-diyldi-2,1-ethenediyl bisbenzenesulfonic acid, disodium salt. These particular dyes are anionic and have a solubility in distilled water of 25* g/l at 25° C., and 300 g/l at 95° C. These an other commercially available fluorescent dyes increase the viscosity of solutions of hydroxyethylcellulose by a substantial degree, especially if the fluid pH is carefully controlled to the range of from 6 to 8. Another useful dye material which applicants have found to be suitable for this purpose is marketed under the trademark BLANCOPHOR SV by BASF-Wyandotte.

A fluid suitable for use as the viscous fluid of this invention is water having dissolved therein from about 0.15 to about 1 percent by weight of hydroxyethylcellulose and from about 0.08 to about 0.5 percent by weight fluorescent dye. Persons skilled in the art of using such fluids will of course recognize that more polymer is required to produce the necessary viscosity at relatively higher temperatures, and so adjustments with within or beyond the above range may be necessary.

Of course, since the viscosifying fluid being injected into the formation is going to be mixed with connate water, greater amounts of hydroxyethylcellulose and fluorescent dye may be incorporated into the fluid for injection since dilution will likely occur within the formation to a certain extent. It is important, however, that the active ingredients be well mixed when injected into the oil formation.

One could use higher amounts of hydroxyethylcellulose than one percent by weight and still remain within the scope of the invention, but that would create higher viscosity and a potential pumping problem. A higher concentration of fluorescent dye, up to 10% or more, could be used and still remain within the invention scope, but it would be a waste of dye without adding any benefit to the invention.

The above described aqueous fluid containing hydroxyethylcellulose and the fluorescent dye exhibits a most unique viscosity response to changes in pH, and it is this unusual response that is utilized to achieve the desired viscosity change of the fluid of the present invention which allows recovery of the injected material without damaging the formation. The viscosity of an aqueous, fluid containing the above described amounts of hydroxyethylcellulose and fluorescent dye is in the range of 200 to 400 centipoise at the original pH, which is usually from 6 to 8, but decrease in viscosity as the pH falls to values less than 6 is very dramatic, as can be seen in the experimental section below. The solution could be at a higher pH than the 6-8 range, but then more acid would be required to lower pH below 6.0.

It is desired that the pH reducing additive which causes the reduction in viscosity at the appropriate time after the formation stimulating material has been pumped through the wellbore past the high viscosity block and placed in the oil producing formation to stimulate oil production, cause the pH of the fluid to drop from a value in the range of from 6 to 8 to a value of 6.0 or less, preferably 5.5 or less, most preferably to about 4.0 or less, which is sufficient to cause the sharp reduction in fluid viscosity desired for this particular application. Ordinarily, the amount of time required to pump the aqueous fluid down the production well and into the water zone is in the range of from one to four hours, and usually around two to three hours. This would be followed by several hours of injection of the formation stimulating material whether it is hydrochloric acid, carbon dioxide or other known formation stimulating fluids to be pushed into place to acidize or otherwise stimulate the oil bearing strata of the formation. Accordingly, the pH reducing additive should be one which will react slowly to form an acid, thereby reducing the pH in a time interval in the range of 8 to 16 hours, such that after the stimulating material has been allowed to react in the formation, the fluid viscosity will be reduced which permits recovery of the viscosifying fluid.

Any substance which reacts slowly with water to form acid may be utilized for the pH reduction necessary to cause a drop in viscosity in order to achieve the desired effect in the fluid in the method of our invention. Acid anhydrides have been found to be particularly useful for this purpose, although the anhydride chosen must be one which reacts sufficiently slowly that the pH reduction will not occur until after the stimulating fluid has been placed in the oil formation for acidizing. Relatively low molecular weight acid anhydride such as acetic anhydride or propionic anhydride react much too quickly for our purpose. Higher molecular weight mono basic organic acid anhydrides can sometimes be used for this purpose. Polybasic acids, especially the high molecular weight anhydrides, such as succinic acid, glutaric acid or adipic acid may be used. Any polybasic acid having the following formula: $HOOC-(CH_2)n\ COOH$ where n is from 3 to 7 may be reacted to form a cyclic anhydride which will be suitable for use in the process of our invention.

An especially preferred anhydride for use in our process are the cyclic anhydrides of dicarboxylic aromatic acids. In particular, the cyclic anhydride of orthophthalic acid is the especially preferred anhydride. Since phthalic anhydride is relatively insoluble, even the low concentrations required in this use may involve some undissolved, dispersed phthalic anhydride. As the material hydrolyzes to form an acid, the undissolved anhydride will be dissolved in the aqueous fluid and so all of the phthalic anhydride will eventually be utilized after the fluid has been formulated and pumped into location, which makes this use particularly preferred. The desired change in pH will be achieved if the concentration of the acid forming material, specifically, our preferred embodiment, phthalic anhydride is from $1.0 \times 10^{-3}$ to $4.0 \times 10^{-3}$ and preferably $1.5 \times 10^{-3}$ to $2 \times 10^{-3}$ percent based on the total weight of the fluid.

The water or brine is thoroughly mixed with the anhydride. It is this mixture of the anhydride with the aqueous solution that gives the surprisingly easy retrieval of the material from the formation. As the anhydride hydrolyzes to the acid form, the pH is reduced throughout the highly viscous hydroxyethylcellulose solution and causes an internal reduction in the viscosity of the solution. This is relatively uniform throughout and when the stimulating fluids are recovered from the oil formation, either through production or direct pumping from the formation, the viscosifying material will also be removed from the formation with the inevitable water that is produced. Thus, the permeability of the oil bearing formation is improved while the permeability of the water bearing formation is left in tact without resultant damage to the overall formation. The water produced from the formation acts to remove the blocking fluids.

An experiment was conducted to demonstrate the variation in viscosity of a fluid comprising water, 0.2% hydroxyethylcellulose, 0.1% dye and 3% salt. The pH of the solution was reduced in 0.5 pH unit increments with phosphoric acid and the viscosities were measured. The results are shown in the Table below:

TABLE

| Fluid pH | Viscosity, Cps. |
| --- | --- |
| pH 6 | 186.0 |
| pH 5.5 | 11.0 |

TABLE-continued

| Fluid pH | Viscosity, Cps. |
|---|---|
| pH 5.0 | 8.0 |
| pH 4.5 | 9.5 |
| pH 4.0 | 9.0 |

Since the solution could be diluted somewhat by the presence of the connate water, analysis of such water would be appropriate to determine the viscosity, taking into account the mixing propensity of the solution when pumped together. Of course, the open permeability and mixability of the aqueous solutions would tend to direct the high viscosity aqueous solution to the water zone of relatively high permeability where the temporary block of this invention would reside. Injection of the block would be followed closely by injecting the stimulating material whether it be hydrochloric acid or some other well known material. If it is an acid then some surface reduction of the pH would cause a breakdown of the viscosity along the periphery of the temporary block. This would be considered by one skilled in the art in preparing the volume of high viscosity material to be injected into the formation in the first place. It is, however, the internal reduction of viscosity through the hydrolysis of the anhydride which leads to successful temporary blocking of the water zone of the oil formation of this invention.

In forming the mixture, the hydroxyethylcellulose and the fluorescent dye are mixed together thoroughly or transported to the well site in dry form. This may be allowed to be transported to the well site where the anhydride, preferably phthalic anhydride, is added to the solution. It is then immediately injected into the oil formation through the wellbore such that the maximum time is accorded for it acting as a blocker in the formation. It is better that the pH reduction, hence the viscosity reduction, not take place until after the stimulation fluids have had the opportunity to be placed into position and also to operate to stimulate the formation. Even if the anhydride is slow in hydrolyzing and causing the reduction of viscosity in the aqueous block, when the viscosity reduction does occur, it will be easily removed from the well as other fluids, even if the well has already been returned to production. Accordingly, there is no criticality in connection with the maximum time in which it takes the block to be recovered.

Although this invention has been described in terms of a series of specific preferred embodiments and illustrative examples which are believed to include the best mode for applying the invention known to applicant at the time of this application, it will be recognized to those skilled in the art that various changes may be made in composition and methods described herein without departing from the true spirit and scope of our invention which is defined more precisely in the claims appended immediately hereinafter below.

I claim:

1. In a method of stimulation of an oil producing subterranean formation, having a water zone of relatively high permeability and an oil bearing zone of lower permeability, penetrated by a wellbore, by injecting a stimulation material into the formation, allowing it to react in the formation and retrieving the stimulation material through the wellbore, the improvement which comprises the steps of:

injecting into the formation, into the aqueous zone of high permeability, prior to the injection of the stimulation fluid, a viscosifying aqueous solution of from about 0.15 to about 1 percent by weight of hydroxyethylcellulose, from about 0.08 to about 0.5% by weight of a fluorescent dye and an amount of an acid anhydride or mixtures thereof effective to reduce the pH of the aqueous solution to about 6.0 or less in a predetermined period of time, to form a temporary viscosity block between the aqueous zone of high permeability and the oil zone of lower permeability, by mixing with connate water in the water zone raising the pH, causing solution to viscosify;

injecting the stimulation fluid through the wellbore into the oil producing formation, allowing such stimulation fluid to react in the formation; and retrieving the stimulation fluid, including the viscosifying solution, in a water solution through the wellbore.

2. The method as recited in claim 1 wherein the acid anhydride has the formula $HOOC-(CH_2)n\ COOH$ where n is from 3 to 7.

3. The method as recited in claim 2 wherein the acid anhydride is succinic anhydride.

4. The method as recited in claim 2 wherein the acid anhydride is glutaric anhydride.

5. The method as recited in claim 1 wherein the acid anhydride is phthalic anhydride.

6. The method as recited in claim 1 wherein the concentration of acid anhydride is from $1 \times 10^{-3}$ to $4 \times 10^{-3}$ percent by weight.

7. The method as recited in claim 1 wherein the concentration of acid anhydride is from $1.5 \times 10^{-3}$ to $2 \times 10^{-3}$ percent by weight.

8. The method as recited in claim 1 wherein the aqueous fluid is a brine.

9. The method as recited in claim 8 wherein the fluid is saturated with sodium chloride.

10. The method as recited in claim 1, wherein the concentration of hydroxyethyl cellulose is from about 0.17 to 0.22 percent by weight.

11. The method as recited in claim 1, wherein the concentration of fluorescent dye is from about 0.09 to 0.11 percent by weight.

* * * * *